United States Patent Office 3,213,128
Patented Oct. 19, 1965

3,213,128
DEMETHYLATION PROCESS
Eugene J. Fornefeld, Hugh R. Sullivan, Jr., and Wayne E. Thompson, Indianapolis, Ind., assignors to Eli Lilly and Company, Indianapolis, Ind., a corporation of Indiana
No Drawing. Filed Apr. 22, 1963, Ser. No. 274,788
4 Claims. (Cl. 260—490)

The present invention relates to a novel process for the preparation of 3-acetoxy-6-methylamino-4,4-diphenylheptane, a potent analgesic represented by the following formula:

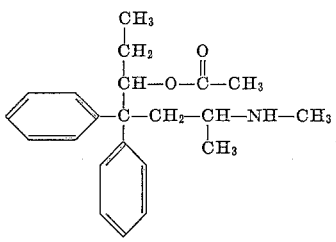

The above-represented compound possesses a high degree of analgesic activity.

The analgesic activity is surprising since it is known that other active analgesic agents which have a tertiary amino function lose the greater part of their activity when the tertiary amino group is converted to a secondary amino group. Thus, for example, the highly effective analgesics, morphine, codeine, and methadone, all of which contain methylated tertiary amino groups, are converted to compounds which are substantially devoid of analgesic activity when the tertiary amino group is converted to a secondary amino group by the removal of one of the N-methyl substituents.

It will be noted that the compound represented by the above formula possesses two differently constituted asymmetric carbon atoms. Accordingly, different forms of the compound are possible, these consisting of two diastereoisomers, each of which can be resolved into dextro- and levorotatory isomers. The two diastereoisomers have been arbitrarily distinguished as α- and β-isomers, the designation α- having been given to that diastereoisomer, or more properly, diastereoisomeric pair, whose hydrochloride salt was obtained first on crystallization, while the second diastereoisomeric pair obtained from the crystallization has been called the β-isomer.

Although the α- and β-forms of the above-represented aminoheptane compound have substantially the same analgesic activity, the d- and l-forms of each diastereoisomeric pair differ in the amounts of analgesic activity they possess. Thus, the dextrorotatory isomer of the α-diastereoisomeric pair has a greater analgesic activity than its levorotatory enantiomorph. In the present instance the α-d- and α-l-secondary amines illustrated by the above formula are more active analgesics than are the tertiary amines of the same configuration. This is the only example of this phenomenon so far noted in the literature. [Eddy, Chemistry and Industry, 1462–1469 (1959).]

The subject compound is described by Pohland in U.S. Patent No. 3,021,360 (February 13, 1962), who also gives methods for its preparation. One method involves the reduction of 6-benzylmethylamino-4,4-diphenyl-3-heptanone to yield 6-benzylmethylamino-4,4-diphenyl-3-heptanol, which in turn is acetylated, then debenzylated with palladium and hydrogen to yield by fractional crystallization the α- and β-forms of the subject compound.

An alternative method outlined in the same patent involves the debenzylation of α-6-benzylmethylamino-4,4-diphenyl-3-heptanol with a palladium catalyst and hydrogen to yield α - 6-methylamino-4,4-diphenyl-3-heptanol, which is acetylated to yield α-3-acetoxy-6-methylamino-4,4-diphenylheptane. This alternative route has the disadvantage of concomitantly producing a quantity of diacetylated compound in which both the secondary amino group and the hydroxyl group are acetylated.

It is an object of the present invention to provide a simple and effective method for the production of 3-acetoxy-6-methylamino-4,4-diphenylheptane, which method is free from the disadvantages of the previously described processes.

Other objects of the present invention and advantageous features thereof will become apparent as the description proceeds.

The monodemethylation process of the present invention involves first the reaction of 3-acetoxy-6-dimethylamino-4,4-diphenylheptane (generically known as acetylmethanol) with a lower-alkyl azodicarboxylate in a suitable organic mutual solvent, and second, the hydrolysis of the intermediate product with dilute aqueous acid. The acetylmethadol can be prepared according to the procedure of Pohland et al., J. Am. Chem. Soc., 71, 460–2 (1949), and the lower-alkyl azodicarboxylate can be synthesized following the method described by Rabjohn, Org. Syn. Coll., vol. III, p. 375.

The demethylating agent employed can be illustratively the methyl, ethyl, n-propyl, n-butyl, or the like azodicarboxylate. Aromatic hydrocarbon or saturated aliphatic hydrocarbon liquids are preferred as solvents, such as benzene, toluene, n-hexane, petroleum ether, or the like.

In accordance with the invention, the desired monodemethylation is accomplished in two steps. The first step is brought about by commingling starting material, for example, α - 3 - acetoxy - 6-dimethylamino-4,4-diphenylheptane (α-acetylmethadol), with a lower-alkyl azodicarboxylate in a suitable inert organic mutual solvent and allowing the reaction to proceed at a moderately elevated temperature, suitably around 40–80° C., preferably 50–60° C. Moderate application of heat is generally required to bring the reaction mixture up to optimum temperature for maximum yield, which is usually obtained by heating for from about one to about six hours. The reaction period may be prolonged if desired, but without increasing or decreasing the yield.

The intermediate product obtained in this first stage of the reaction, α-3-acetoxy-6[N-methyl-N-(1,2-dicarbethoxyhydrazinomethyl)amino] - 4,4 - diphenylheptane, may be recovered from the reaction mixture, if desired, in a conventional manner, such as by evaporating the solvent at reduced pressure. Alternatively, the intermediate product may be allowed to remain dissolved in all or part of the organic solvent utilized in the first step of the reaction, and treated therein for the second step.

The second step of the monodemethylation reaction, the hydrolysis of the intermediate product, supra, is accomplished by heating the intermediate product with dilute aqueous acid, suitably of a concentration in the range of about 0.25 N to about 2.5 N, preferably 0.5 to 1.5 N. The acid concentration should be less than about 5 N to prevent deacetylation of the intermediate compound from occurring in addition to the requisite hydrolysis. Aqueous one normal hydrochloric acid, may be used, for example, at a moderately elevated temperature, suitably 40–100° C., preferably around 50–60° C., for from one to six hours. During the latter part of this period, a white precipitate begins to separate, this precipitate being the desired product, α-3-acetoxy-6-methylamino-4,4-diphenylheptane hydrochloride. It is recovered by cooling the reaction mixture and filtering. Yields are generally in the range of about 80–90 percent of theory.

While the illustrative operating procedure utilizes α-acetylmethadol, the monodemethylation of β-acetylmethadol can be accomplished in the same manner and under the same conditions.

The process is more clearly illustrated by the following operating example.

*Example 1*

In a 250 ml., three-neck flask, equipped with a reflux condenser, stirrer, and thermometer, was placed 17.6 g. (0.05 mole) of α-3-acetoxy-6-dimethylamino-4,4-diphenylheptane, and a solution of 10.0 g. (0.057 mole) of crude ethyl azodicarboxylate in 75 ml. of benzene was added. The reaction mixture was thereafter stirred and warmed overnight at about 50–55° C., then evaporated to dryness in vacuo while applying the minimum of external heat. The residue was taken up in about 75 ml. of 1 N aqueous hydrochloric acid. The resulting mixture was warmed on the steam bath at about 50–60° C. for about five and one-half to six hours to hydrolyze the intermediate product, α-3-acetoxy-6-[N-methyl-N-(1,2-dicarbethoxyhydrazinomethyl)amino] - 4,4 - diphenylheptane. During the last two to three hours of the warming period, a white precipitate separated, this being the hydrochloride salt of α-3-acetoxy-6-methylamino-4,4-diphenylheptane. At the end of the warming period, the reaction mixture was cooled to between zero and 5° C. and the crystalline product filtered off. It was washed with water, dried at 60° C. in vacuo, and found to have a melting point of about 227–229° C. A small sample for analysis was recrystallized from methanol, and melted at about 228.5–230.5° C.

*Analysis.*—Calc.: C, 70.28; H, 8.04; N, 3.73. Found: C, 70.04; H, 8.29; N, 3.48.

We claim:
1. In a process for preparing 3-acetoxy-6-methylamino-4,4-diphenylheptane, the steps which comprise commingling 3-acetoxy-6-dimethylamino-4,4-diphenylheptane with a lower-alkyl azodicarboxylate in an inert organic mutual solvent, and exposing the resulting mixture to a temperature in the range of about 40 to about 80° C. for a time sufficient to complete the reaction thereof; commingling the reaction mixture with dilute aqueous acid, and exposing the resulting mixture to a temperature in the range of about 40 to about 100° C. for a time sufficient to hydrolyze said reaction product, whereby 3-acetoxy-6-methylamino-4,4-diphenylheptane is produced in the form of the corresponding acid addition salt thereof.

2. In a process for preparing 3-acetoxy-6-methylamino-4,4-diphenylheptane, the steps which comprise commingling 3-acetoxy-6-dimethylamino-4,4-diphenylheptane with a lower-alkyl azodicarboxylate in a liquid hydrocarbon solvent, and exposing the resulting mixture to a temperature in the range of about 40 to about 80° C. for a time sufficient to complete the reaction thereof; distilling solvent therefrom; adding dilute aqueous acid thereto, and exposing the resulting mixture to a temperature in the range of about 40 to about 100° C. for a time sufficient to hydrolyze said residue, whereby 3-acetoxy-6-methylamino-4,4-diphenylheptane is obtained in the form of the corresponding acid addition salt thereof.

3. In a process for preparing 3-acetoxy-6-methylamino-4,4-diphenylheptane, the steps which comprise commingling 3-acetoxy-6-dimethylamino-4,4-diphenylheptane with ethyl azodicarboxylate in *n*-hexane solution, and exposing the resulting mixture to a temperature in the range of about 50 to about 55° C. for a time sufficient to complete the reaction thereof; distilling solvent therefrom under reduced pressure at about room temperature; commingling the residue with dilute aqueous acid of a concentration in the range of about 0.5 N to about 1.5 N, and exposing the resulting mixture to a temperature in the range of about 50 to about 60° C. for a time sufficient to hydrolyze said residue, whereby 3-acetoxy-6-methylamino-4,4-diphenylheptane is obtained in the form of the corresponding acid addition salt thereof.

4. In a process for preparing 3-acetoxy-6-methylamino-4,4-diphenylheptane, the steps which comprise commingling 3-acetoxy-6-dimethylamino-4,4-diphenylheptane with ethyl azodicarboxylate in benzene solution, and exposing the resulting mixture to a temperature in the range of about 50 to about 55° C. for a time sufficient to complete the reaction thereof; distilling the solvent therefrom under reduced pressure at about room temperature; commingling the residue with dilute aqueous acid, of a concentration in the range of about 0.5 N to about 1.5 N, and exposing the resulting mixture to a temperature in the range of about 50 to about 60° C. for a time sufficient to hydrolyze said residue, whereby 3-acetoxy-6-methylamino-4,4-diphenylheptane is obtained in the form of the corresponding acid addition salt thereof.

No references cited.

LORRAINE A. WEINBERGER, *Primary Examiner.*

LEON ZITVER, *Examiner.*